United States Patent
Tam et al.

(10) Patent No.: US 6,437,710 B1
(45) Date of Patent: Aug. 20, 2002

(54) ENCODER WITHIN A COMMUNICATION SYSTEM THAT AVOIDS ENCODED DC ACCUMULATION AND CAN USE CODING VIOLATIONS TO SYNCHRONIZE A DECODER AND DETECT TRANSMISSION ERRORS

(75) Inventors: Pak Y. Tam; Horace C. Ho; Rainer P. Mueller; David J. Knapp, all of Austin, TX (US)

(73) Assignee: Oasis Design, Inc., Austin, TX (US)

( * ) Notice: Subject to any disclaimer, the term of this patent is extended or adjusted under 35 U.S.C. 154(b) by 0 days.

(21) Appl. No.: 09/710,220

(22) Filed: Nov. 10, 2000

(51) Int. Cl.[7] ................................................ H03M 5/00
(52) U.S. Cl. ........................................ 341/58; 341/59
(58) Field of Search .............................. 341/58, 59, 68, 341/69

(56) References Cited

U.S. PATENT DOCUMENTS

| | | | |
|---|---|---|---|
| 3,810,111 A | 5/1974 | Patel ........................ 340/174.1 |
| 4,027,335 A | 5/1977 | Miller ........................ 360/40 |
| 4,227,184 A | 10/1980 | Howells et al. ............... 340/34 |
| 4,234,897 A | 11/1980 | Miller ........................ 360/45 |
| 4,310,860 A | 1/1982 | Leiner ........................ 360/40 |
| 4,414,659 A | 11/1983 | Beckers ....................... 369/59 |
| 5,617,553 A | 4/1997 | Minagawa et al. .......... 395/416 |
| 6,008,746 A | * 12/1999 | White ......................... 341/70 |

* cited by examiner

*Primary Examiner*—Peguy Jeanpierre
(74) *Attorney, Agent, or Firm*—Kevin L. Daffer; Conley, Rose & Tayon P.C.

(57) ABSTRACT

A communication system is provided for interconnecting a network of digital systems. Each node of the communication system may include a transceiver and an encoder/decoder. The encoder codes an incoming data stream and forwards the encoded data stream across a communication link based on a DC-adaptive encoding mechanism. The encoded data stream is substantially free of a DC value that would skew the detector components at the receiver end of the communication link. Moreover, the encoded signal is forwarded at no greater than the incoming bitstream. Encoding occurs dependent on a digital sum value of the preceding clock cycle ($DSV_{n-1}$) for the encoded bitstream and the logic values for the incoming bitstream during the current clock cycle n as well as the subsequent clock cycle n+1. Encoding according to normal encoding or multiple-ones encoding is dependent on those values. A coding violation can be used within a preamble to synchronize a decoder, detect transmission errors, and to quickly lock the phase-locked loop within the receiver.

22 Claims, 8 Drawing Sheets

| Line | Inputs | | | | | Outputs | | |
|---|---|---|---|---|---|---|---|---|
| | Bit$_n$ | Bit$_{n+1}$ | dsv_sum$_{[0..n-1]}$ | Middle-transition | Multiple_ones | Transition | Middle_transition | Multiple_ones |
| e1 | 0 | X | X | No | X | Beginning | Unchanged | Unchanged |
| e2 | 0 | X | X | Yes | X | None | No | Unchanged |
| e3 | 1 | 0 | X | X | No | Middle | Yes | Unchanged |
| e4 | 1 | 1 | 0 | X | No | Middle | Unchanged | Unchanged |
| e5 | 1 | 1 | -1,1 | X | Yes | Beginning | Unchanged | Yes |
| e6 | 1 | X | X | X | Yes | None | Unchanged | No |

Initial Conditions: dsv_sum[0]=0, middle_transitions=No, multiple_ones=No, n=1

| Line | Inputs | | | Outputs | |
|---|---|---|---|---|---|
| | Transition in bit-period$_n$ | Transition in bit-period$_{n+1}$ | Next_bit_is_one | Bit$_n$ | Next_bit_is_one |
| d1 | Middle | X | X | 1 | Unchanged |
| d2 | Beginning | None | X | 1 | Yes |
| d3 | Beginning | Beginning,middle | X | 0 | Unchanged |
| d4 | None | X | No | 0 | Unchanged |
| d5 | None | X | Yes | 1 | No |

ENCODER WITHIN A COMMUNICATION SYSTEM THAT AVOIDS ENCODED DC ACCUMULATION AND CAN USE CODING VIOLATIONS TO SYNCHRONIZE A DECODER AND DETECT TRANSMISSION ERRORS

BACKGROUND OF THE INVENTION

1. Field of the Invention

This invention relates to a communication system comprising a network of interconnected transceivers, encoders and decoders. The encoders can produce a bitstream encoded at the same rate as the source data and, over time, incurs no DC accumulation. The encoded bitstream can be wrapped within a packet or frame with a preamble having a coding violation used not only to synchronize a decoder but also to detect transmission errors.

2. Description of the Related Art

Communication systems are generally well known as containing at least two nodes interconnected by a communication line. Each node may include both a transmitter and a receiver, generally referred to as a "transceiver." The transceiver provides an interface between signals sent over a communication line and a digital system which operates upon that signal in the digital domain.

Figure 1:
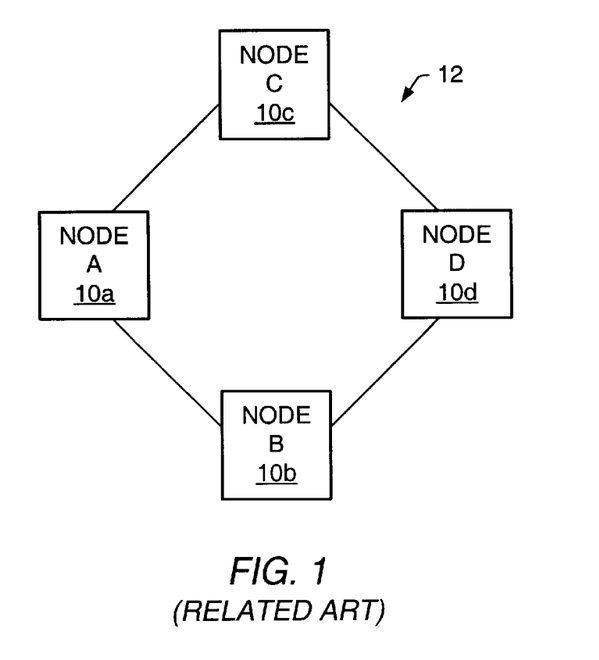
FIG. 1 is a block diagram of a communication system of interconnected nodes across which input and output data are forwarded.

FIG. 1 illustrates a set of nodes 10 interconnected by one or more communication lines, to form a communication system or network 12. The network topography or backbone can vary depending on its application. The signal transmitted across the network can contain instructions and/or data, which conceivably could be audio data, video data, or both and, therefore, the network can be considered a multi-media network. The transfer rate of multi-media signals may be generally quite high and may require a relatively high speed communication line, a suitable line being an optical fiber, for example.

Figure 2:
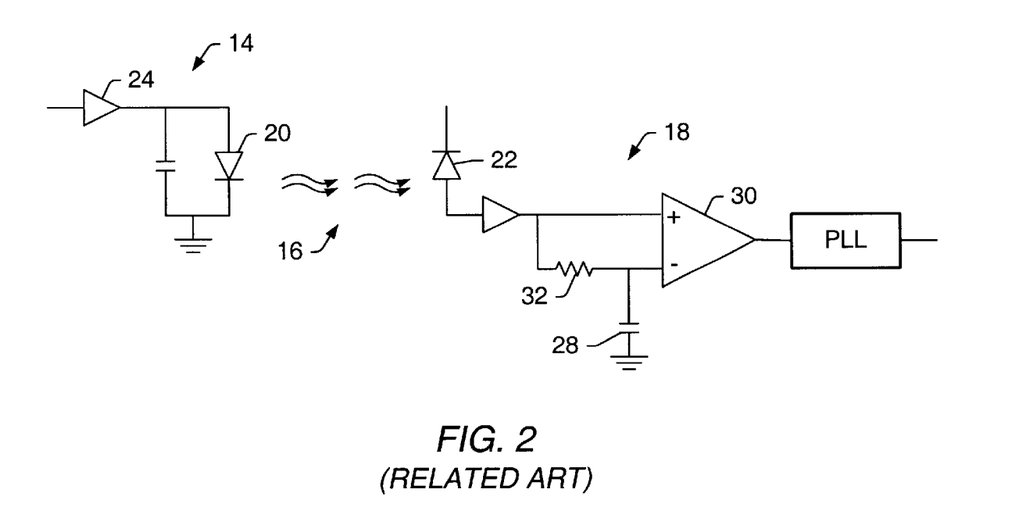
FIG. 2 is a circuit schematic of a transmitter and receiver linked by a optical signal path of the communication network.

If an optical fiber is used, then the receiver portion of the transceiver converts light energy to an electrical signal. FIG. 2 illustrates a transmitter portion 14 of a transceiver linked by a communication line 16 to a receiver portion 18 of another transceiver. Transmitter 14 includes a light emitting diode ("LED") 20 that converts electrical signals to optical or light energy forwarded across communication line 16. At a node remote from transmitter 14, receiver 18 includes a photosensor 22.

The load capacitance of LED 20 may require a substantial amount of drive current from amplifier 24. The higher the bit rate, the more current need be driven to LED 20. Likewise, the higher the transmitted bit rate, the greater the electromagnetic ("EM") radiation at both the transmitter 14 and receiver 18.

The data transmitted across communication line 16 is generally encoded and placed within a packet or frame. A need exists for transferring data at a high bit rate; however, it is important that the overhead needed to encode that data be substantially minimized. In other words, if encoding were to add unnecessary transitions in the transferred data, then impermissibly high drive current is needed to more quickly transition LED 20. The speed by which LED 20 can transition is limited by the capacity of components within transmitter 14, and also the EM radiated by transmitter 14.

Figure 3:
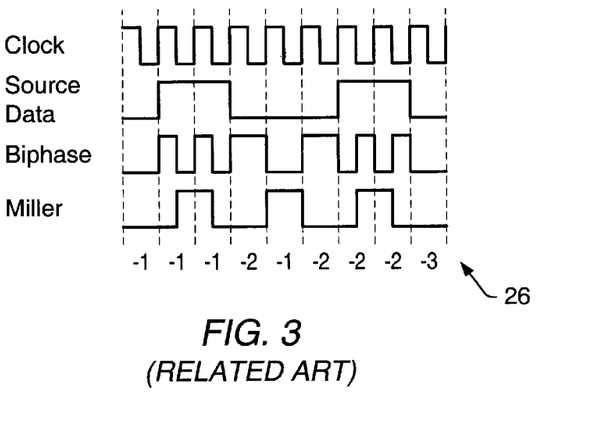
FIG. 3 is a timing diagram of coding schemes which either input at twice the input ("source") data rate or have an accumulated DC value.

FIG. 3 illustrates an incoming bitstream of source data, and the resulting encoding of that source data. Encoding is shown according to either a biphase code or a Miller code, both of which are fairly popular coding mechanisms. The source data maximum transmission rate (defined as the minimum source data cycle) is limited to two clock cycles. In other words, each high or low pulse of the source data is equal to or greater than one clock cycle. The biphase coding scheme, however, requires that for each logic high value of source data, a transition occurs at the middle as well as boundary regions of that clock phase. The biphase coding scheme thereby encodes the data rate at twice the source data rate whenever the source data encounters a logic high value. This significantly reduces the available bandwidth of the transmission line and, as described above, the current draw and EM radiation of the transmitter will significantly increase.

FIG. 3 also illustrates the Miller coding scheme. Miller coding has one distinct advantage over biphase coding in that the encoded data rate is not twice the source data rate. The Miller encoded data rate is designed to be the same as the source data rate to enhance the total available bandwidth of the transmission line and reduce the burdens upon the components of the transmitter and receiver. In Miller coding, a logic high value is encoded by a transition at the center or middle of a clock phase, while logic low voltage values are encoded by transitions at the boundary of a clock phase. The minimum distance between transitions of neighboring logic low and high voltage values is, however, maintained at one clock phase or clock cycle.

An unfortunate aspect of Miller coding is that the encoded bitstream incurs an accumulated DC value. As shown in FIG. 3, a logic low voltage value for the duration of one clock phase represents a negative DC value ("−1"), and a logic high voltage value during a clock phase represents a positive DC voltage value ("+1"). It is desirable that the accumulated DC voltage value be at the median between logic high and logic low voltage values. On line 26, the cumulative DC voltage value, also know as the digital sum value (or "DSV") is shown for the Miller coding. A transition at the middle of a clock cycle or phase represents no change in DC voltage value ("0") thereby not adding to or taking away from the DSV. DSV indicates the Miller coding becomes more and more skewed towards the logic low voltage value, as indicated by a −3 DSV for the source data shown.

Referring to FIGS. 2 and 3 in combination, a skewed DC value from a voltage at the midline between logic high and logic low voltage values (i.e., a DSV greater than or less than 0) will accumulate upon capacitor 28 and the input node of comparator 30. Accumulation of a DC value or "offset" will cause what is known as baseline wander, which causes receiver 18 to detect an encoded signal which is dependent upon the bit sequence of that signal. Detection is no longer based on an ideal DC-free coding signal, but instead, wanders from the baseline or midline voltage value.

It would be beneficial to introduce an encoder and coding methodology that avoids coding at a higher rate than the incoming source data, but without introducing unduly large, cumulative DC voltage. The improved encoder is therefore one which produces minimal DC skew for relatively short periods of time, and over a more lengthy time period, produces no DC skew whatsoever. The desired DC skew can occur only for short durations which would advantageously be less than the RC time constant of resistor 32 and capacitor 28, shown in FIG. 2 as a low-pass filter at the input of comparator 30. The desired encoder and encoding methodology can be used in any communication system employing transmitters and receivers and, while beneficially used in an optical transmission system, the improved encoder and methodology can be used to transmit signals over copper wire or through an air (optical or acoustic) medium, for example.

SUMMARY OF THE INVENTION

The problems outlined are in large part solved by an improved encoder, communication system, and methodology thereof. The communication system is one which can forward multi-media signals across airwaves, copper wire, and/or fiber optic cables. The coding mechanism is chosen to forward the coded bitstream at a rate not to exceed the source data, and the encoded data is substantially DC-free. In many instances, the times in which the encoded data is not DC-free can be relatively short, and assuredly shorter than the RC time constant of the receiver, regardless of the form of that receiver.

The DC-free encoded bitstream is henceforth referenced as a DC-adaptive bitstream or "DCA" bitstream. The encoded DCA bitstream is partially based on the DSV of the previous clock cycle, which is the cumulative DC value of the encoded DCA bitstream cumulative through the previous clock cycle. The DSV is guaranteed by the encoder to not exceed +1 or be less than −1, and therefore is always equal to +1, 0, or −1.

To encode, knowledge is needed of the cumulative DC value ("DSV") up to and including the previous clock cycle ($DSV_{n-1}$), the logic voltage value of the source data for the current clock cycle ($bit_n$), and the logic value of the source data for the following clock cycle ($bit_{n+1}$). Depending on those values and/or logic states, the encoder can make a determination on whether it is to operate under a normal encoding state or a multiple-one encoding state.

When operating under the normal encoding state, the encoder will encode a logic high voltage value by transitioning the encoded signal at substantially the middle of the clock cycle. To encode a logic low voltage value, there will be no transitions in the middle of the clock cycle and instead will cause transitions at the beginning or end (i.e., boundary) of the clock cycle, depending on the whereabouts of the preceding or successive encoded transitions. Thus, an encoded logic low value will cause a transition at a clock cycle boundary (i.e., between cycle n−1 and n and/or between clock cycle n and n+1), unless there is a middle transition in the encoded signal in a clock cycle immediately before or after the present clock cycle boundary. DSV will be incremented or decremented according to the DC value of the DCA encoded bitstream. A DSV of a clock cycle with a middle transition is the same as the DSV of the previous clock cycle. That is, no DC value accrues for a middle transition.

Multiple-one encoding occurs under two circumstances. If the DSV of the previous clock cycle ($DSV_{n-1}$) is non-zero and the current and next clocking cycles (n, n+1) encounter a pair of logic high voltage values, then a transition will occur at the beginning of the current clock cycle n and no transitions will occur between clock cycle n and clock cycle n+1.

By ensuring a transition at the beginning of clock cycle n and not in the middle of clock cycle n, the DC value during clock cycle n will not to be zero, but instead will offset $DSV_{n-1}$. In this manner, coding multiple-ones (i.e., multiple logic high values) will not further skew the DSV outside of a tolerable range. More importantly, the relatively short DC skews will be less than the RC time constant of the receiver so as to essentially produce a DC-free encoded signal when viewed from the perspective of the detector's low-pass filter. The detector can therefore enjoy the benefits of non-detectable baseline wander as well as an encoded bitstream that has the same data rate as the source data. The multiple-one encoding mechanism is adaptably employed based on the $DSV_{n-1}$ and the present and successive source data bits ($bit_n$ and $bit_{n+1}$).

According to one embodiment, an encoder is presented. The encoder can be adapted to encode a logic high voltage value that occurs during an n clock cycle by producing a transition near the beginning of the n clock cycle, provided a logic high voltage value occurs during an n+1 clock cycle and the sum of DC voltage values of all encoded logic high and low voltage values is skewed toward either a logic high or low voltage value prior to the n clock cycle. The sum thusly described is referenced as $DSV_{n-1}$.

When not operating in a multiple-one encoding scheme, the encoder can encode logic high voltage values by producing transitions near the middle of clock cycle n during which the logic high voltage value occurs. Transitions near the middle of n clock cycle may occur if the encoder does not encounter multiple-one voltage values circumstances of the incoming bitstream. Therefore, a transition near the middle of the n clock cycle may occur if a logic low voltage value occurs during the n+1 clock cycle or the DC voltage value of clock cycle n−1 ($DSV_{n-1}$) is not skewed.

An erroneous transition that does not meet the aforesaid rules can be purposely placed near the middle of n clock cycle, or at the boundary between n and n+1 clock cycles to signal a coding violation. The erroneous transition may be produced near the middle or end of the n clock cycle (between the n clock cycle and the n+1 clock cycle) if a logic high voltage value occurs during the n and n+1 clock cycles and $DSV_{n-1}$ is skewed. Alternatively, not producing a transition where it should be have validly placed can also cause a coding violation. In whatever form, whether a missing, valid transition or an erroneous transition, the coding violation serves to synchronize a decoder. The erroneous transition or missing, valid transition can occur within a preamble of a packet or frame of data to signal the beginning of an encoded sequence of the DCA bitstream.

According to a further embodiment, a communication system is presented. The communication system includes an encoder that is linked to a decoder by a transmission line. The encoder is coupled to produce an encoded bitstream of data interposed in time between a first preamble and a second preamble. The first preamble can be encoded with a first DC voltage value (i.e., first DSV cumulative to the end of the first preamble), and the second preamble can be encoded with a second DC voltage value (i.e., a second DSV cumulative to the end of the second preamble). The decoder can receive a first and second preamble and compares the first DC voltage value with the second DC voltage value to determine if an error occurred during transmission of the encoded bitstream across the transmission line. The first and second DC voltage values can be the same or dissimilar. For example, an adder may be used to determine if the sum of the first DC voltage value and the second DC voltage value is skewed from a midline voltage. In this instance, the first DC voltage value can be 0 and the second DC voltage value can be 0, whereby the adder should produce an added DC voltage value of 0. Alternatively, but not exclusively, a comparator may be used to determine if either the first DC voltage value or the second DC voltage value is dissimilar from 0, +1 or −1, depending on the chosen DC voltage values. If the DC voltage value is something other than what is expected, then it is known that an error occurred in transmission between the time of the first preamble and the second preamble. According to yet another error detection methodology, it is known that the DSV of the encoded bitstream must remain between −1 and +1. If the DSV exceeds +1 (i.e., +2) or is less than −1 (i.e., −2), then it is known that an error occurred during transmission. The error can be pinpointed to the frame or packet at which at out-of-range condition occurs.

The decoder can be synchronized using various mechanisms, examples of which are the detection of a misplaced or erroneous transition, or the detection of an encoded pulse which was, for example, longer than the longest allowable pulse. The same can apply in the detection of a cycle longer than or shorter than the longest or shortest allowable encoded cycle. Once the decoder detects a coding violation, the decoder can be synchronized as to where the bit-boundary occurs to prevent decoding, for example, a "0000" bitstream instead of a "1111" bitstream.

According to yet another embodiment, a method is described for encoding a bitstream of logic low and logic high voltage values. The method includes the steps of computing a sum of DC voltage values for all encoded logic low and logic high voltage values prior to an n clocking cycle (i.e., $DSV_{n-1}$). A logic high voltage value can be detected within the bitstream during the n clock cycle and an n+1 clock cycle. Thereafter, a transition is produced within an encoded bitstream near the beginning of n clock cycle and not between clock cycles n and n+1, provided the $DSV_{n-1}$ is skewed toward either the logic high or logic low voltage values and a logic high voltage value for the source data has been detected during clock cycles n and n+1.

BRIEF DESCRIPTION OF THE DRAWING

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF PREFERRED EMBODIMENTS

Figure 4:
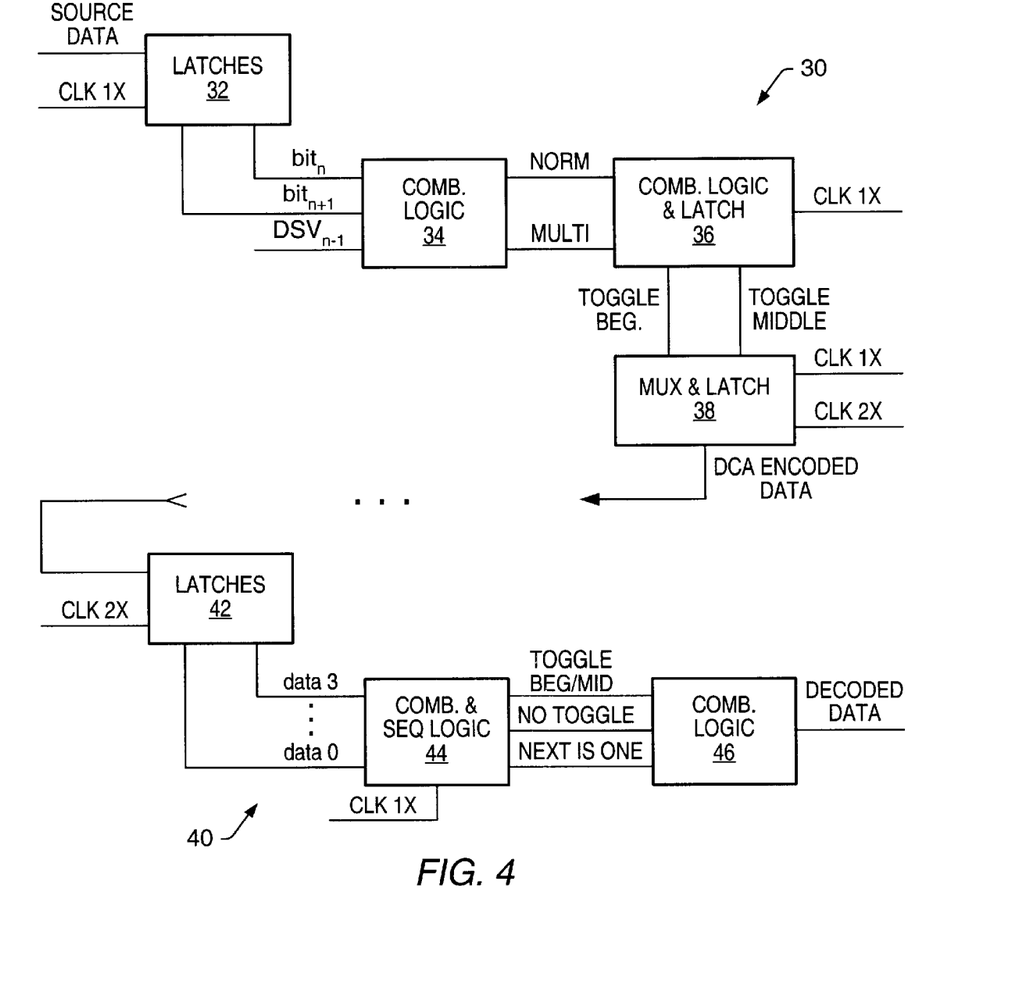
FIG. 4 is a block diagram of an encoder which produces a DC-free encoded data stream at the same data rate as the input data rate, and a decoder which decodes the encoded data stream.

Turning to the drawings, FIG. 4 illustrates one example by which an encoder and decoder hereof can be implemented. Encoder 30 is shown in a block diagram as receiving an incoming bitstream of source data. Source data is synchronized with a clocking signal (CLK 1X) and latches 32 connected in series produce bits at corresponding clock cycles. A DSV of encoded logic states at clock cycle n−1 ($DSV_{n-1}$) along with the bit values of source data at cycles n and possibly n+1 are fed into combinatorial logic 34, which then produces a signal that indicates either normal encoding (NORM) or multiple-one encoding (MULTI). Combinatorial logic and associated latch, shown as block 36, produces a corresponding transition either at the beginning of the clock cycle n or at the middle of clock cycle n. The transition, or toggle, is multiplexed upon and latched to a certain clock edge, either CLK 1X or CLK 2X, depending on when the transition occurs. A corresponding DCA bitstream of encoded data is thereafter produced from block 38.

Encoder 30 can be implemented in numerous ways, an example of only one way is shown. Regardless of how encoder is formed, the result is that of a DCA bitstream which either toggles at the beginning or at the middle of clock cycle n depending on whether coding occurs according to normal or multiple-one format, and depending on the status of $bit_n$, $bit_{n+1}$, and $DSV_{n-1}$.

Coupled to receive the encoded data from encoder 40 via the transmission line is a decoder 40. Decoder 40 includes latches 42 which receive the encoded data synchronized to clocking signal CLX 2X. Output from the series-connected latches 42 are four bits of data, noted as data0 through data3. It is worthwhile noting that decoding is only on the transitions of the encoded bitstream and requires no knowledge of DSV. Primarily, one bit-pair of data is needed for decoding transitions within cycle n, and in some circumstances another bit-pair of data at cycle n+1 is needed. Thus, two samples (i.e., a bit-pair) are needed for each clock period. For example, to decode a middle transition, two bits of a bit-pair are needed to detect either a logic 0 followed by a logic 1 or a logic 1 followed by a logic 0. A table of an exemplary decoding algorithm is described below in reference to FIG. 8. Since it is possible to utilize the present decoder 40 within a byte-switched network, several bits of data must be latched. For example, a node may receive byte A or byte B, but wish to transmit byte A followed by byte C. Since the encoding of the last bit of byte A depends on the first bit of byte B, the last bit of byte A will have to be decoded and then re-encoded using the first bit of byte C in order to accomplish byte switching. As per this example, bit pairs across byte boundary need be stored by latches 42 and presented to logic 44 along with a slower clock (CLK 1X) than CLK 2X. Logic 44 then appropriates the necessary transition point within clock cycle n based on the status of bits at clock cycle n and possibly clock cycle n+1 within respective bytes. Logic 46 then presents the decoded data that corresponds with transactions or toggle positions indicated by the incoming signals. Similar to encoder 30, decoder 40 can be implemented in numerous ways, and that FIG. 4 illustrates only one example of a mechanism for producing decoded data from DCA encoded data.

Figure 5:
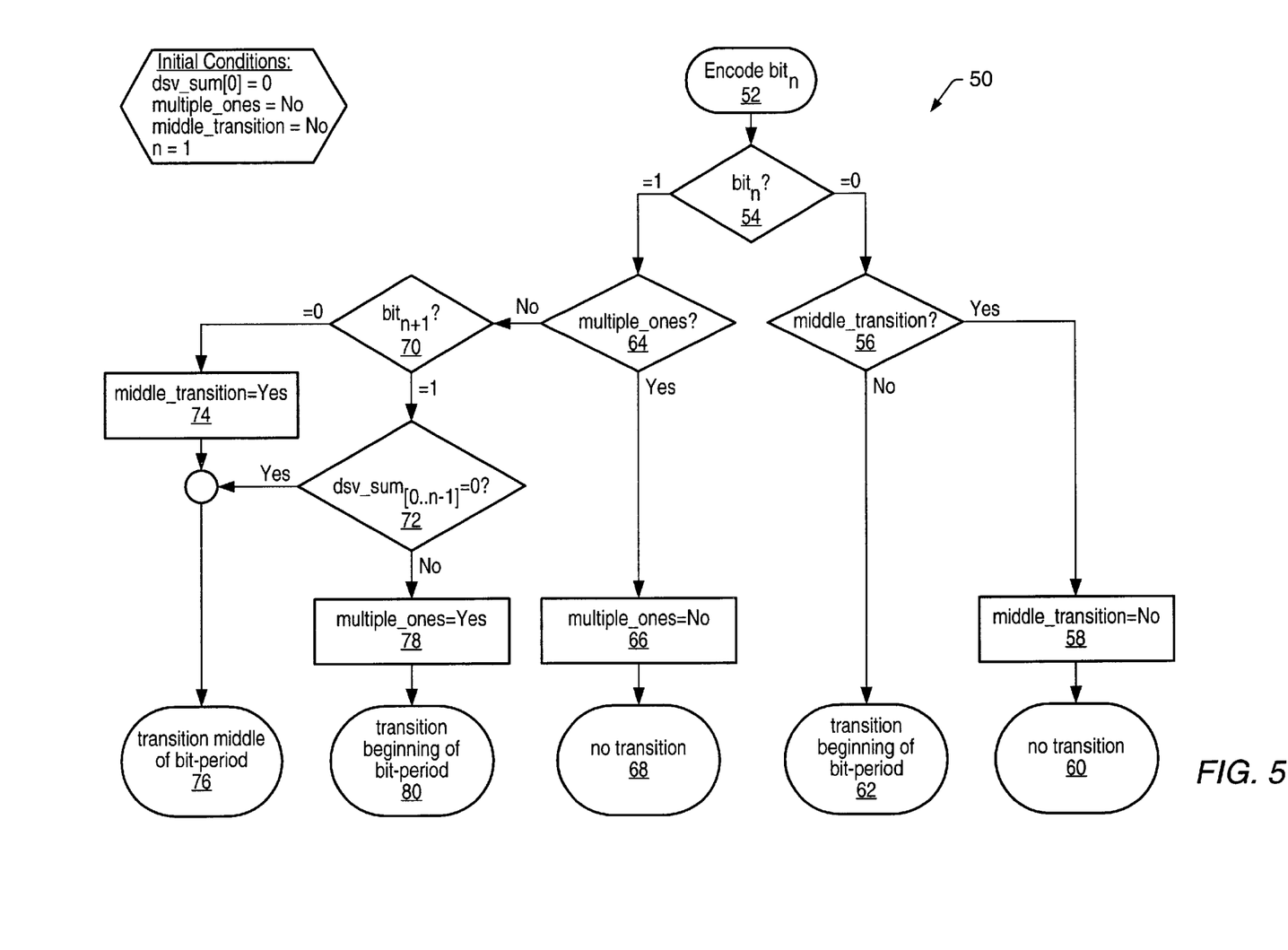
FIG. 5 is a flow diagram of the DC-free encoding mechanism used by the encoder of FIG. 4.

FIG. 5 illustrates a flow diagram of an encoding mechanism 50. Encoding can be achieved in hardware or software, or a combination of both, depending on the application and the speed at which encoding must be achieved. Encoding 50 begins by assuming certain initial conditions. For example, $DSV_{n-1}$ is shown in the example as set to 0, a multiple-one condition does not exist, and the n−1 clock value does not exhibit a middle transition (i.e., a transition between the clock cycle boundaries). The initial step is one which examines the encoding of $bit_n$, as shown by block 52. The incoming source data of $bit_n$ is looked at to determine if its value is a logic 1 or logic 0, as shown by block 54. If the incoming source data (non-encoded data) for the current $bit_n$, is 0, then a determination must be made whether or not encoding during the previous clock cycle n−1 demonstrates a transition at the middle of that clock cycle or at the boundary, as shown by decision block 56. If the transition during clock n−1 is at the middle of that clock cycle (i.e., middle_transition=yes), then the middle_transition state is reset to "no", as shown by block 58, and there is no transition at the beginning of the clock cycle n, as shown by block 60. If, however, $bit_n$ value is at logic 0, and there is no middle transition for the previous encoded clock cycle, then the current clock cycle n can undergo a transition at the beginning of that cycle, as shown by block 62. Thus, block 62 indicates that logic 0 values are encoded with a transition at the beginning of the corresponding clock cycle. Note that once block 74 is achieved, the sequence of events is block 76, followed by 52, then 54, then 56, then 58, then 60, then 52, then 54, then 56, then 62, or block 74, followed by 76 , then 52, then 54, then 56, then 58, then 60, then 52, then 54, den 64, etc.

Encoding flow diagram 50 is also indicative of encoding a logic high value or "1" for $bit_n$. If $bit_n$ is 1, then determination must be made whether or not the encoding state is currently in a multiple-one encoding state, as shown by block 64. If so, then the encoding output will transition from a multiple-one encoding state to a state that is not multiple-one, as shown by block 66. Correspondingly, no transition will occur at the beginning or at the middle of clock cycle n, as shown by block 68. If it is verified that a multiple-one condition does not exist as an input to the encoder, then the logic value of $bit_{n+1}$ is queried, as shown by block 70. If the incoming bitstream for clock cycle n+1 is at a logic 1 value, then determination must be made on whether $DSV_{n-1}$ is 0, as shown by block 72. If so, then it is noted that the incoming bitstream for clocks n and n+1 are logic 1 and logic 0 values, respectively, or are both logic 1 values if $DSV_{n-1}$ is 0, thereby allowing a middle transition at clock n, as shown by blocks 74 and 76. If, in addition to the incoming signal having a logic high value for both clocks n and n+1, as well as $DSV_{n-1}$ being non-zero, then a multiple-one condition exists, as shown by block 78. Accordingly, transition will occur at the beginning of clock cycle n, as shown by block 80.

Figure 6:
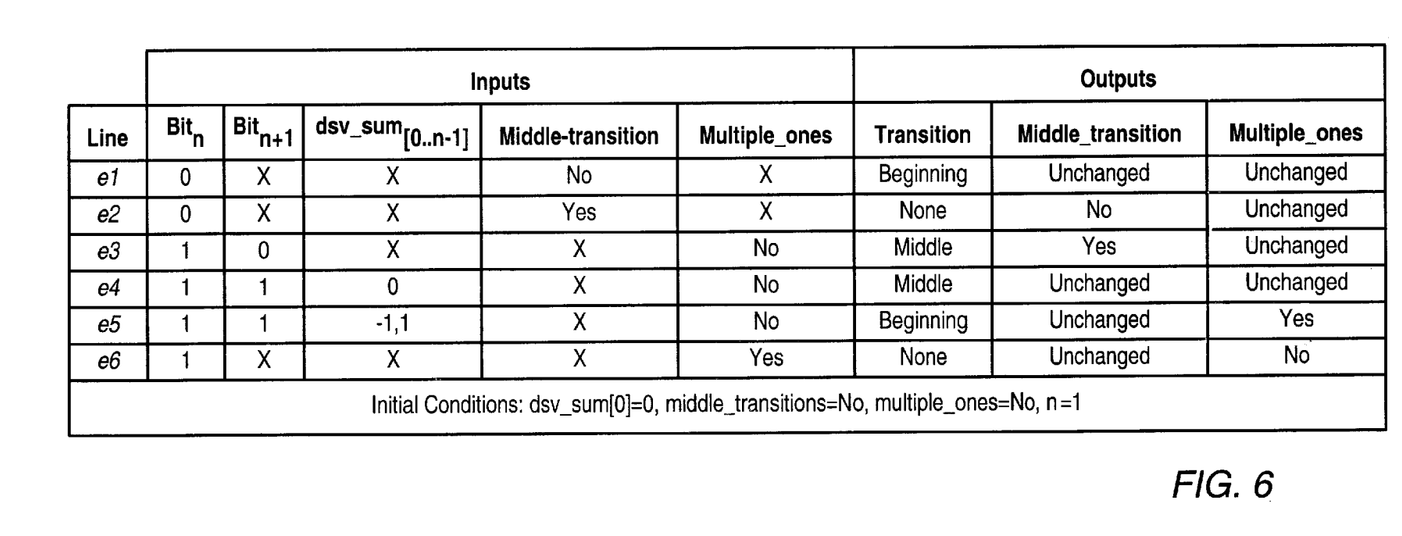
FIG. 6 is a table of various encoding results for cycle n which depends on the DSV for cycle n−1, and bit values for cycle n and possibly n+1.

Turning to FIG. 6, a table is shown indicative of the encoding mechanism of FIG. 5. In particular, FIG. 6 illustrates inputs used in determining an appropriate encoding output. The inputs comprise the incoming bitstream $bit_n$ and $bit_{n+1}$, as well as the summed DC values up to and including clock cycle n−1. In addition, the inputs include the location of encoded transitions existing in the previous clock cycle, as well as whether or not the previous clock cycle underwent multiple-one encoding. The encoding outputs are noted as to the locations in which the current clock cycle n will undertake transition (either at the beginning or middle of the clock cycle, or possibly at neither location). Moreover, the encoded output will note whether or not the existing clock cycle is undergoing multiple-one encoding. As an aid in understanding the table of FIG. 6, and the encoding flow diagram of FIG. 5, line e1 corresponds to the flow diagram branch culminating in block 62. Line e2 is shown in the flow diagram branch culminating in block 60. Line e3, as well as line e4, is shown in the flow diagram branch culminating in block 76, whereas lines e5 and e6 culminate in blocks 80 and 68, respectively.

Referring to FIGS. 5 and 6 in conjunction, multiple-one encoding takes place if the incoming bitstream for clock cycles n and n+1 (i.e., $bit_n$ and $bit_{n+1}$) are equal 1, and the $DSV_{n-1}$ is a value other than 0 (i.e., is −1 or +1). Under these conditions, the encoding mechanism 50 indicates a multiple-one encoding at block 78 and a corresponding transition at the beginning of clock cycle n, shown at block 80. Encoding of all other conditions is primarily dependent on the presence of clock transitions for the encoded bitstream of the preceding clock cycle and/or the subsequent clock cycle. If the preceding clock cycle is encoded with a transition at the middle of that cycle, then the current clock cycle cannot be encoded with a transition at the beginning thereof. In this manner, the encoding mechanism is ensured to not have transitions less than one clock cycle apart. Thus, the encoded bitstream transitions at a rate not to exceed the source data, or incoming data stream.

Determination whether to employ multiple-one encoding or normal encoding depends only if clock cycle n bit value of the source data is a logic high voltage value or "1". If it is not, then normal encoding can occur at cycle n boundaries depending on the transition status of the previous or subsequent encoded clock cycle. As shown by in FIGS. 5 and 6, if the clock cycle n bit value is not equal to 1 (i.e., is a logic low value), then a follow-up decision must be made on whether the encoded bitstream at cycle n−1 involves or will involve a transition at the middle of those respective cycles. If the coded signal produces a transition at the middle of clock cycle n−1, then no transition can occur at the beginning of cycle n boundary (at the boundary between clock cycle n−1 and n). If no transition occurs at the middle of clock cycle n−1, then a transition can occur at boundary of clock n−1 and n.

The flow diagram of FIG. 5, and the table of FIG. 6, help to illustrate both multiple-one encoding and normal encoding. Normal encoding will look at where the transition occurs in the previous clock cycle to determine if a current clock cycle will be encoded as a transition at the beginning of that clock cycle. The same can be said for successive clock cycles (i.e., when encoding all clock cycles which follow clock cycle n, whereby the rules used in encoding for clock cycle n also apply for succeeding cycles). If the clock cycle n bit value is equal to one, then a decision now must be made on whether to employ multiple-one coding or normal coding, as shown by block 64. If normal encoding ensues, then any incoming logic high voltage value will be coded as a transition at the middle of that cycle bit, as shown by block 76. As described above, coding of logic low voltage values will not induce multiple coding and will instead proceed according to normal coding of transitions (i.e., blocks 60 or 62).

Under multiple-one encoding exception, the $DSV_{n-1}$ is compared against 0, shown by block 72. If the logic value of $bit_{n+1}$ at clock cycle n+1 yields a logic high value, and $DSV_{n-1}$ is not equal to 0, then multiple encoding ensues. If multiple-one encoding conditions are met, then transition will occur at the beginning of cycle n. However, if clock cycle n+1 does not yield a logic high value regardless of the status of $DSV_{n-1}$, then coding will yield a transition at the middle of clock cycle n, shown by block 76.

If $DSV_{n-1}$ is not equal to 0 (is equal to −1 or +1), then decision block 72 is utilized under conditions at cycle n+1 and n yield a logic high value. Accordingly, multiple-ones encoding will take place, as shown by block 78 and 80.

The encoding mechanism shown is FIGS. 5 and 6 describe the encoding of a source data bitstream ($bit_1$, $bit_2$, $bit_3$ . . . ) into DCA encoded data. The mechanism determines whether there is a transition at the beginning of the bit-period, in the middle of the bit-period, or neither at the beginning or at the middle of the bit-period. Encoding a $bit_n$ is based only upon the bit value, the next bit value ($bit_{n+1}$), the DSV of the previous bit ($DSV_{n-1}$), the multiple-one state (a pair of 1's and DSV value of the previous bit being non−0), and the middle transition state (i.e., whether there was or wasn't a middle transition in the previously encoded bit).

Figure 7:
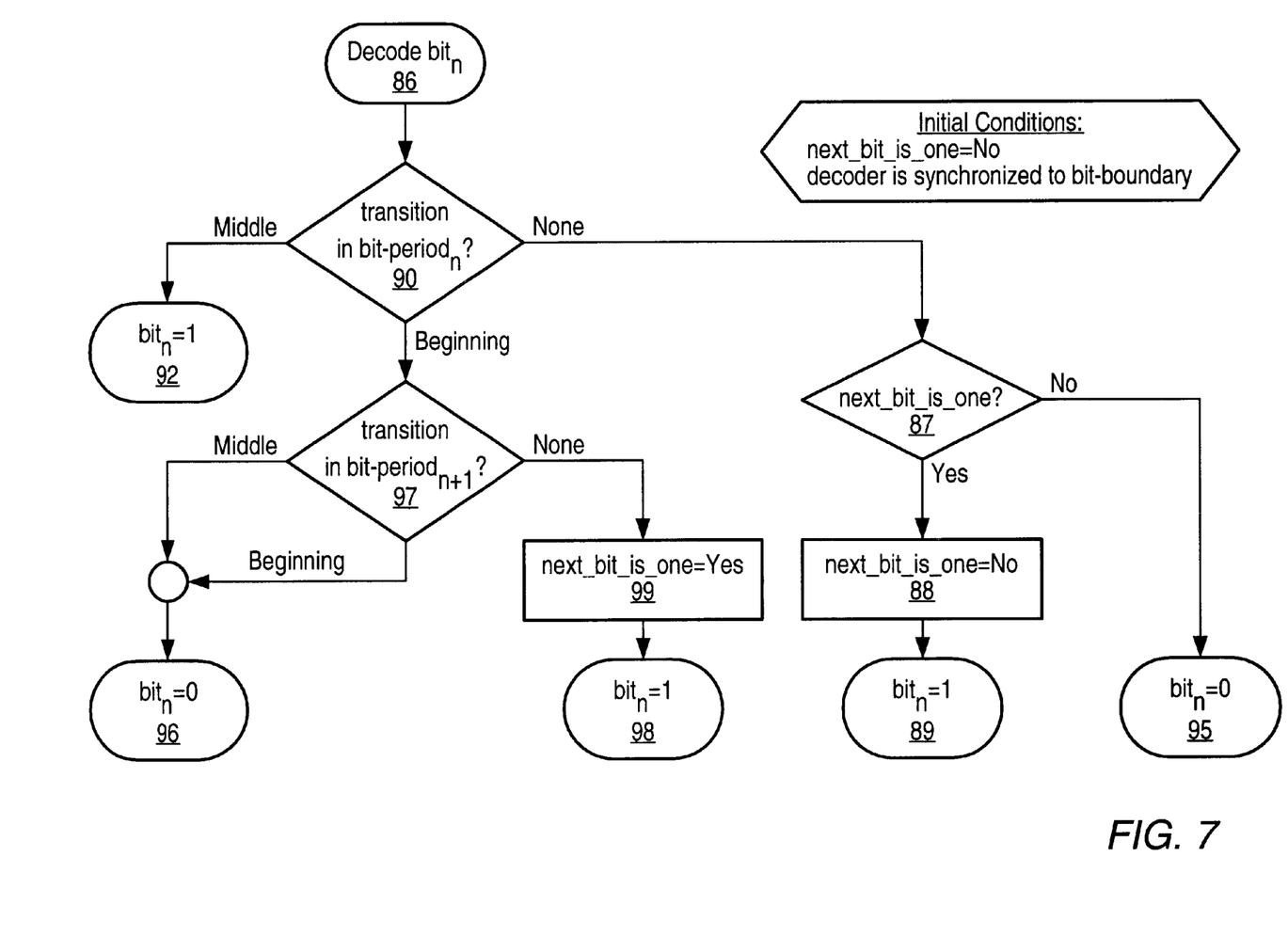
FIG. 7 is a flow diagram describing decoding of bits encoded by the DC-free encoding mechanism shown in FIG. 5.

Turning to FIG. 7, a flow diagram of decoding 84 is shown. Decoding 84 assumes certain initial conditions, such as the next bit of the decoded bitstream not being equal to 1 and the decoder is properly synchronized to that bitstream. Decoding of $bit_n$ is initiated at block 86, and block 90 determines whether the incoming bit stream indicates a transition during bit-period n. If there is not transition, block 87 illustrates a decision on whether the incoming bit stream next bit is equal to 1. If the decoded next bit does not yields a logic 1 value as shown by block 88, then the bit stream of bit-period n (i.e., $bit_n$) will be decoded as a logic 1, shown in block 89. If the incoming bit stream next bit is not equal to logic 1, then the decoded value for $bit_n$ will be equal to 0, as shown by block 95.

If a transition occurs in the middle of bit-period n, then the incoming bit stream of bit-period n will be decoded as a logic 1 value, as shown by block 92. If, however, the transition occurs at the beginning of bit-period n, then another determination must be made as to transitions that occur during bit-period n+1, as shown by decision block 97. If a transition occurs either during the middle of beginning of bit-period n+1, then the incoming bit stream for bit-period n will be decoded as a logic 0, as shown in block 96. If a transition occurs at the beginning of bit-period n and no transition occurs during bit-period n+1. Setting the next_bit_is_one state to "yes" indicates that the next decoded bit is a logic one value. The incoming bit stream for bit-period n will then be decoded as a logic 1, as shown by block 98.

Figure 8:
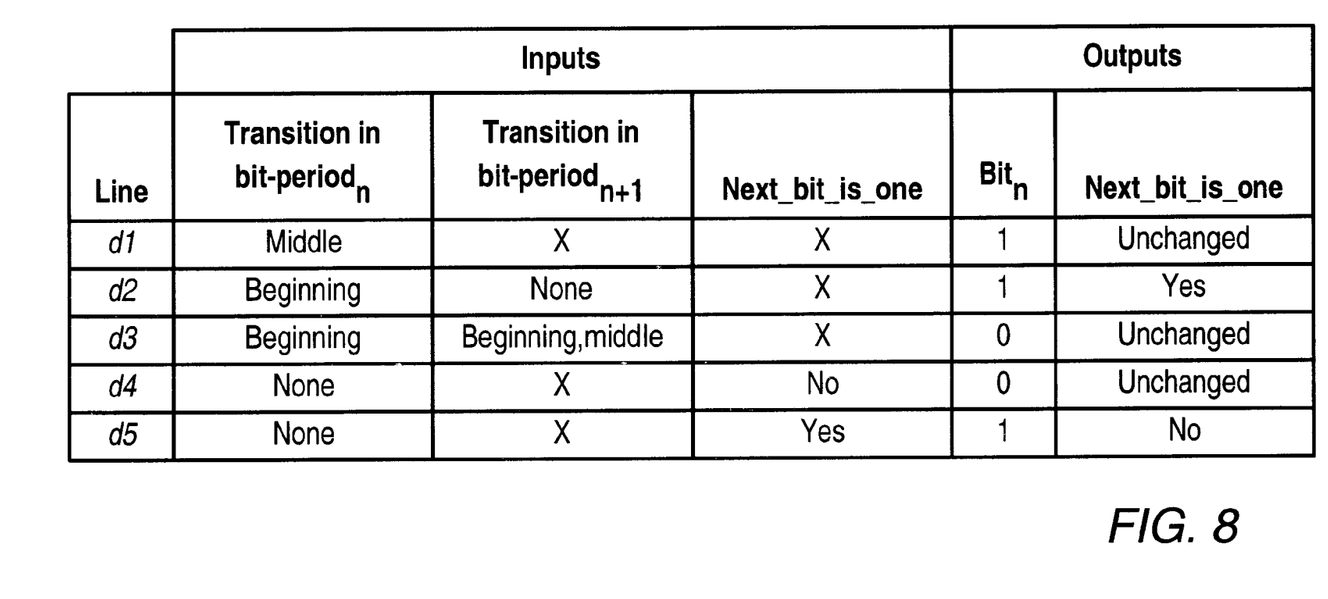
FIG. 8 is a table of various decoding results for transitions which occur at $bit_n$, and possibly also $bit_{n+1}$.

The table of FIG. 8 illustrates the various scenarios shown in FIG. 7. Specifically, the flow ending with reference numeral 92 is indicative of decoding line d1. The flow ending with block 98 is indicative of decoding line d2. The flow ending in block 96 is indicative of decoding line d3, and the flow ending blocks 95 and 89 are indicative of decoding lines d4 and d5, respectively. If the flow proceeds through blocks 99 and 98 for bit bit(n), flow will go through blocks 86, 90, 87, 88 and 89 for bit (n+1). The overall decoding algorithm is better illustrated by looking at each of the decoding lines. For example, decoding line d1 illustrates a middle transition in bit-period n that was encoded either by lines e3 or e4, both of which are encoding a logic 1 value. Regarding line d2, the beginning transition in bit-period n was encoded either by lines e1 or e5. No transition during bit-period n+1 was decoded either by lines e2 or e6. The two consecutive bits could not have been encoded by line e1 followed by e2, since line e1 leaves the middle transition state set to a "no" value, and line e2 requires that it be a "yes" value. The two consecutive bits could not have been encoded by line e5 followed by line e2, since the bit following the bit encoded by line e5 is always a logic 1 value. The two consecutive bits could not have been encoded by line e1 followed by line e6, since line e6 is always preceded by line e5, and line e5 is always followed by line e6 (i.e., line e5 sets the multiple-one state and line e6 clears that state). Therefore, the two consecutive bits could only have been encoded by line e5 followed by line e6, which is encoding a logic 1 value.

Regarding the decoding of line d3, the beginning transition in bit-period n was encoded either by lines e1 or e5. If it had been encoded by line e5, it would have been followed by a "no" transition in bit-period n+1. Therefore, the beginning transition in bit-period n could only have been encoded by line e1, which is encoding a logic 0 value. The decoding lines d4 and d5 represent no transitions in bit-period n, and are encoded either by lines e2 or e6. The no transition was encoded either because it followed a middle transition or was the second bit of a multiple-one encoding. Either a state bit indicating a middle transition or a state bit indicating the first bit of a multiple-one encoding can be used to differentiate between the two no transition encodings. The decoder shown uses a state indicating the first bit of a multiple-one encoding. Decoding line d2, which decodes the first bit of a multiple-one encoding, sets the next bit is one ("next_bit_is_one").

Figure 9:
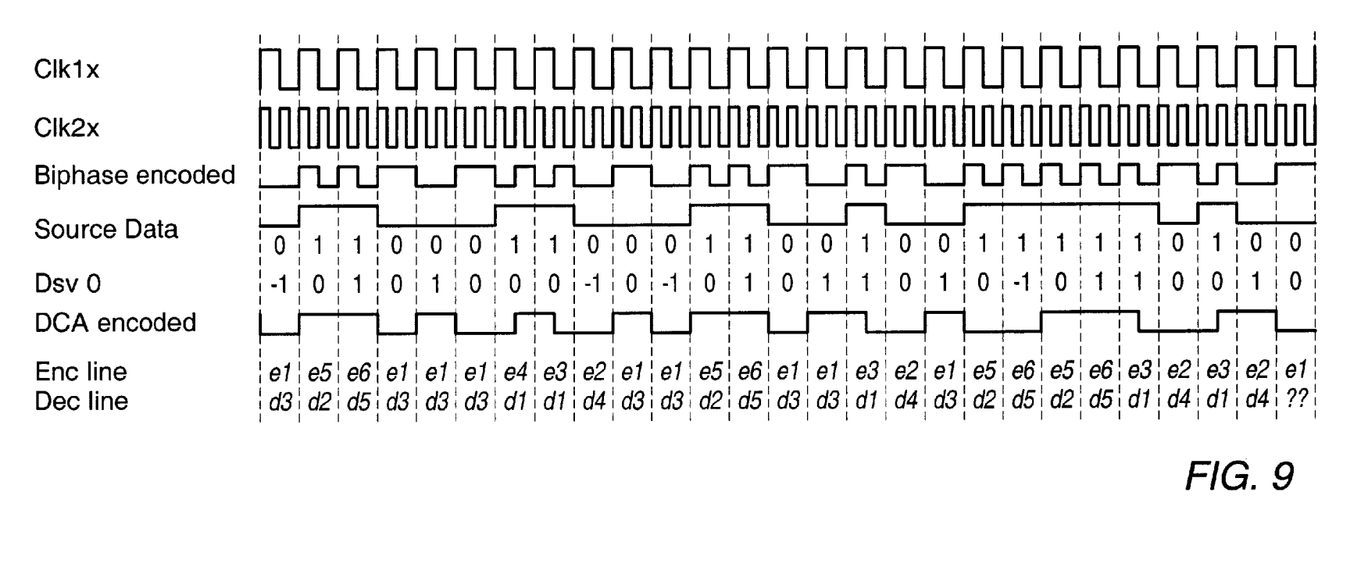
FIG. 9 is a table of various encoding/decoding results for cycle n, showing the encoding lines e1–6 (FIG. 6) and decoding lines d1–5 (FIG. 8)

FIG. 9 illustrates in further detail the aforementioned description, and the correspondence between the encoding lines e1–e6 of FIG. 6 and the decoding lines d1–d5 of FIG. 8. In particular, a DCA encoded bitstream is shown with each clock cycle (clk1x) noting a particular encoding and decoding line number, as well as a DCA encoded value corresponding to source data. FIG. 9 illustrates that two consecutive edges are always guaranteed to be separated by at least one bit-period, or clock cycle. Since a beginning transition cannot occur immediately following a middle transition (see, e.g., line e3 or line e4 which cannot be followed by either line e1 or line e5). In particular, line e3 can only be followed by line e2, since the next bit to be encoded is a logic 0, and the middle transition state is set to a "yes" value. Line e4 cannot be followed by line e1, since the next bit to be encoded is a logic 1 value. Line e4 can also not be followed by line e5, since the DSV after line e4 is still a 0 value and line e5 requires it to be a −1 or +1 value.

Figure 10:
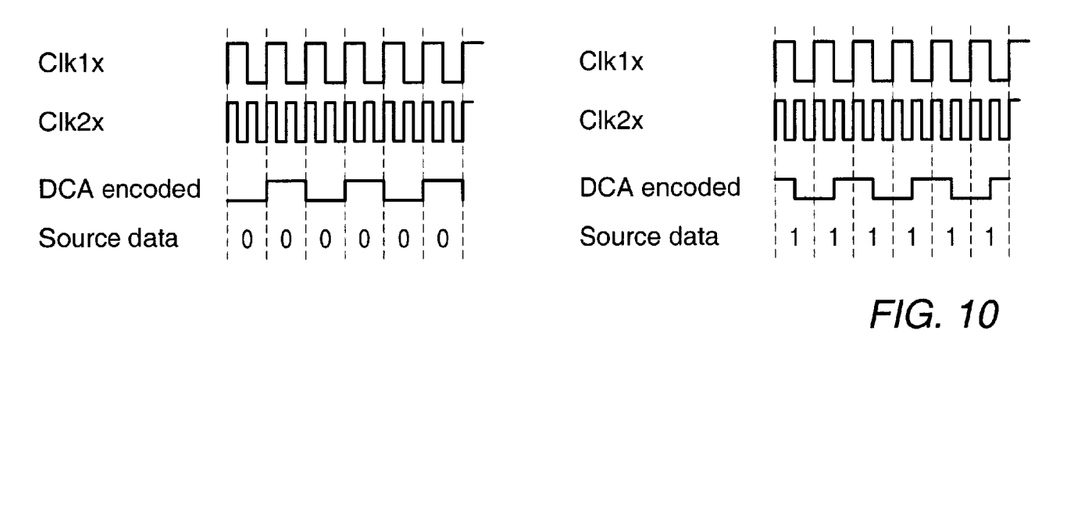
FIG. 10 are timing diagrams of dependency on the boundary at which a decoder is triggered.

In order to implement the decoding algorithm of FIGS. 7 and 8, it is important that the decoding be synchronized with the encoded bitstream. The decoder must differentiate between the first edges or transitions shifted in time. Thus, the decoder must be synchronized with the clock cycle to prevent decoding, for example, a "000000" bitstream when it should be have decoded as a "111111" bitstream depending on where the decoder thinks a clock cycle boundary is located. FIG. 10 illustrates a decoding that synchronizes to a clock cycle boundary necessary to produce a decoded string of zeros versus decoding that synchronizes to a clock cycle boundary necessary to produce a string of ones.

A decoder can be synchronized to a clock cycle boundary in a number of different ways. One way would be to transmit a separate synchronization signal from the encoder to the decoder. Another would be to have the encoder and decoder agree beforehand on the value or location of the first data edge sent from the encoder to the decoder. Another method may be to synchronize the decoder by sending a coding violation with known improper edge locations.

A coding violation can be thought of as any bit sequence which will never be encountered in encoded data and, thus, can be detected as non-data by the decoder. For example, coding violations may be a data sequence containing pulses that are less than the minimum pulse width, pulses that are greater than the maximum pulse width, pulses that are greater than the maximum pulse width starting with the middle transition, an encoded cycle that is greater than the maximum coded cycle, or a DSV that is greater than +1 or less than −1.

Figure 11:
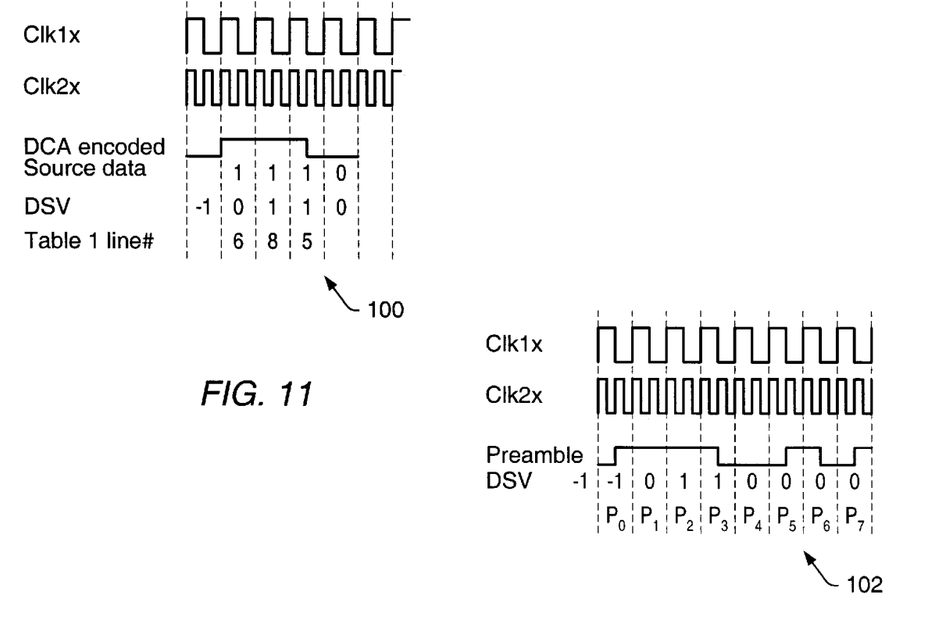
FIG. 11 are timing diagrams of the longest permitted encoded pulse, and a preamble which surpasses the longest permitted encoded pulse to achieve a coding violation for synchronizing a decoder.

FIG. 11 illustrates the maximum pulse width of a DCA encoded signal. In the example shown in FIG. 9, maximum edge separations of a validly encoded DCA pulse cannot exceed 2½ clock cycles of CLK 1X, as shown by reference numeral 100. However, the timing diagram 102 illustrates a coding violation having a pulse greater than 2½ cycles of CLK 1X. The decoder is meant to synchronize with the trailing edge, or a specified number of clock cycles after the trailing edge of the improper pulse. Thus, the coding violation can form a preamble which precedes encoded data. The preamble can be sent as a header within a packet containing data.

Figure 12:
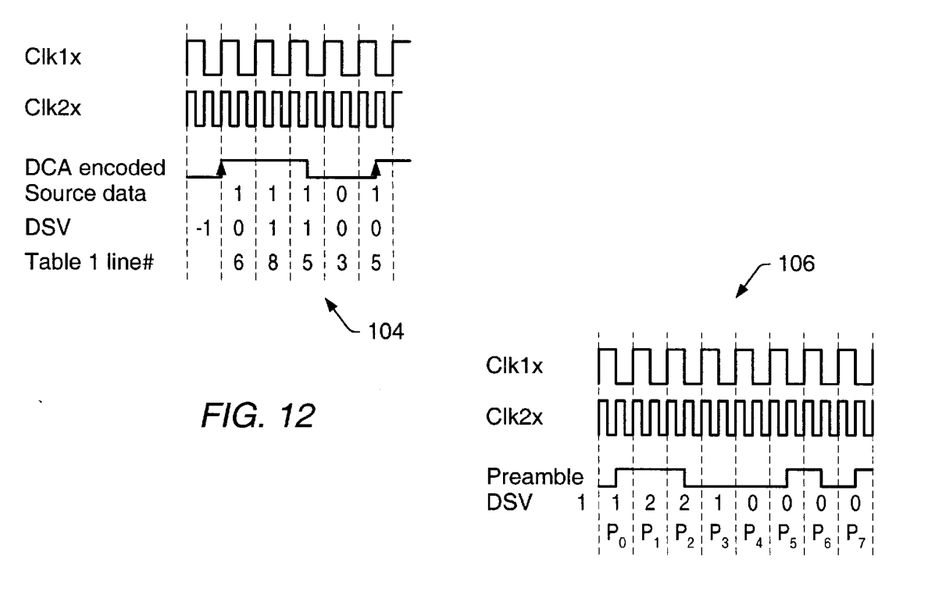
FIG. 12 are timing diagrams of the longest permitted encoded cycle, and a preamble which surpasses the longest permitted encoded cycle to achieve a coding violation for synchronizing a decoder.

FIG. 12 illustrates another type of coding violation, whereby the maximum cycle of a DCA encoded signal is surpassed. In the example of FIG. 12, the maximum DCA encoded signal cycle is 4½ clock cycles, as shown by reference numeral 104. A coding violation would therefore occur if a preamble yields a cycle which exceeds 4½ clock cycles, as shown by reference numeral 106.

The coding violation of FIG. 11 does not illustrate DSV as having exceeded the predetermined range of −1 to +1; however, DSV in FIG. 12 does exceed the range. Thus, it is worthwhile to note that coding violations can be used which either exceed the recommended DSV or which exceed the maximum pulse width or cycle width. In most instances, the preamble used to synchronize the decoder can be achieved within an 8-bit byte. The preamble can serve two functions: to synchronize the decoder at a predetermined clock edge based on the location of the coding violation and to lock the phase-locked loop of the decoder. In the preamble shown in reference numerals 102 and 106, a coding violation occurs early in the byte, followed by a minimum pulse width used to lock the phase-locked loop to that pulse width in a relatively rapid fashion.

Further shown in the preamble of FIGS. 11 and 12, the DSV arising from each of those preambles can be 0 or any value other than 0 (−1 or +1) provided the designer knows beforehand the targeted DSV at the last clock cycle of that preamble. The DSV at the last clock of the preamble could be 0, so that the ensuing data has a $DSV_{n-1}$ of 0. If the first preamble is predetermined as having a DSV of 0, and the second preamble has a DSV of the last clock cycle targeted at 0, then any DSV at the end of the first packet comprising the first preamble and the first embedded, encoded data bitstream is other than 0, then transmission error can be determined for that first encoded bitstream. Thus, DSV can be used to determine transmission errors and, more importantly, detect when the error occurred or which frame encountered transmission error.

It would be appreciated by those skilled in the art having the benefit of this disclosure that the embodiments described herein are believed to be capable of applications involving communication signals across a network of interconnected digital systems, regardless of the communication link medium and regardless of the overall architecture or topography of that network. The present encoder, decoder, communication system, and method of employing the same is useful in numerous network types, architectures, applications, internets, intranets, etc. Various modifications and changes may be made to each and every component of the encoder and decoder, and it is noted that the transceivers which use encoders and decoders hereof can be modified depending on the transmission medium employed. It is intended that the following claims be interpreted to embrace all such modifications and changes and, accordingly, the specification and drawings are to regarded in an illustrative rather than a restrictive sense.

What is claimed is:

1. An encoder adapted to encode a logic high voltage value that occurs during an n clock cycle by producing a transition near the beginning of the n clock cycle provided
    a logic high voltage value occurs during an n+1 clock cycle, and
    a sum of dc voltage values of all encoded logic high and low voltage values is skewed toward either the logic high voltage value or a logic low voltage value prior to the n clock cycle.

2. The encoder as recited in claim 1, wherein said sum of dc voltage values is skewed from a midline voltage value between the logic high and low voltage values.

3. The encoder as recited in claim 1, wherein said sum of dc voltage values is skewed closer to either the logic high voltage value or the logic low voltage value.

4. The encoder as recited in claim 1, the n clock cycle is one clock cycle within a plurality of equal duration clocking cycles which define a maximum frequency of an incoming stream of logic high and low voltage values presented to the encoder.

5. The encoder as recited in claim 4, wherein a maximum transition rate of the encoded logic high and low voltage values does not exceed said maximum frequency of the incoming stream of logic high and low voltage values.

6. The encoder as recited in claim 1, wherein the encoder is adapted to produce a transition near the middle of the n clock cycle provided a logic high voltage value occurs during the n+1 clock cycle and the sum of the dc voltage values is not skewed prior to the n clock cycle.

7. The encoder as recited in claim 1, wherein an erroneous transition produced near a middle of the n clock cycle will signal a coding violation if
    the logic high voltage values occurs during the n+1 clock cycle, and
    the sum of dc voltage values of all encoded logic high and low voltage values is skewed prior to the n clock cycle.

8. The encoder as recited in claim 7, further comprising a decoder which identifies the coding violation and signals the beginning of an encoded sequence of logic high and low voltage values.

9. The encoder as recited in claim 8, wherein the coding violation is contained within a preamble having a middle transition followed by a beginning transition.

10. A decoder, adapted to decode a transition that occurs at the beginning of clock cycle n different depending on whether a transition is absent or occurs during clock cycle n+1, and wherein the transition that occurs during clock cycle n+1 can occur at either the beginning or middle of said n+1 clock cycle.

11. The decoder as recited in claim 10, wherein a logic high bit value is decoded if the transition that occurs during clock cycle n+1 is absent.

12. The decoder as recited in claim 10, wherein a logic low bit value is decoded if the transition that occurs during clock cycle n+1 is either present at the beginning or the middle of said n+1 clock cycle.

13. A communication system, comprising:
  an encoder coupled to produce an encoded bitstream of data interposed in time between a first preamble and a second preamble, wherein said first preamble is encoded with a first dc voltage value, and wherein said second preamble is encoded with a second dc voltage value;
  a transmission line; and
  a decoder coupled to receive the first and second preambles forwarded from the encoder across the transmission line, and to compare the first dc voltage value with the second dc voltage value to determine if an error occurred during transmission of the encoded bitstream of data across the transmission line.

14. The communication system as recited in claim 13, further comprising an adder which determines if the sum of the first dc voltage value and the second dc voltage value is skewed from a midline voltage between a logic high voltage value and a logic low voltage value.

15. The communication system as recited in claim 14, wherein said encoded bitstream of data comprises a cumulative dc voltage value that remains within a pre-defined voltage range of the midline voltage unless an error occurred during transmission of the encoded bitstream of data.

16. The communication system as recited in claim 13, wherein the cumulative dc voltage value deviates from the midline voltage for a time duration less than an resistor-capacitor time constant of a photo-detector within the decoder.

17. A method of encoding a bitstream of logic low and logic high voltage values, comprising:
  computing a sum of dc voltage values for all encoded logic low and logic high voltage values prior to an n clock cycle;
  detecting a logic high voltage value within the bitstream during the n clock cycle and an n+1 clock cycle; and
  after said computing and detecting, producing a transition within an encoded bitstream near the beginning of the n clock cycle provided the computed sum of dc voltage values is skewed toward either the logic high or logic low voltage values.

18. The method as recited in claim 17, wherein said computing comprises keeping track of a running sum of the dc voltage values.

19. The method as recited in claim 17, wherein said producing a transition within the encoded bitstream occurs nearer the beginning of the n clock cycle than the end of the n clock cycle.

20. The method as recited in claim 17, wherein said producing a transition within the encoded bitstream occurs substantially at the beginning of the n clock cycle.

21. The method as recited in claim 17, further comprising producing an erroneous transition within the encoded bitstream near the middle of the n clock cycle if the computed sum of dc voltage values is skewed toward either the logic high or logic low voltage values, and wherein the erroneous transition signals a coding violation which a decoder can identify and synchronized with.

22. The method as recited in claim 21, wherein the coding violation is contained within a preamble having a middle transition followed by a beginning transition.

* * * * *